United States Patent [19]

Turley

[11] 3,740,600

[45] June 19, 1973

[54] SELF-SUPPORTING COIL BRACE
[75] Inventor: Barry J. Turley, Wattsburg, Pa.
[73] Assignee: General Electric Company, Erie, Pa.
[22] Filed: Dec. 12, 1971
[21] Appl. No.: 206,826

[52] U.S. Cl.................. 310/194, 310/214, 310/269
[51] Int. Cl. ........................................... H02k 3/52
[58] Field of Search ................. 310/214, 216, 218, 310/194, 180, 60 A, 269

[56] References Cited
UNITED STATES PATENTS
| 434,206 | 8/1890 | Schmid | 310/269 |
| 912,551 | 2/1909 | Field | 310/194 |
| 729,414 | 5/1903 | Reist | 310/194 X |

Primary Examiner—D. F. Duggan
Attorney—Walter C. Bernkopf, Frank L. Neuhauser and Oscar B. Waddell et al.

[57] ABSTRACT

A wedge-shaped device to be frictionally inserted between adjacent pressed-to-form, edge-wise-wound, coils of a salient pole machine to prevent separation of the coils from the poles by the tangential component of centrifugal force acting on the coils. A flange portion integrally secured to the inner end of the wedge extends in opposite directions to be interposed in close relationship between the rotor core and each of the adjacent coils to hold the wedge in place.

5 Claims, 4 Drawing Figures

Patented June 19, 1973

3,740,600

SELF-SUPPORTING COIL BRACE

BACKGROUND OF THE INVENTION

This invention relates generally to dynamoelectric machines and in particular to rotor construction of salient pole machines.

In dynamoelectric machines intended for relatively high speed operation, the stresses induced in the structure due to centrifugal forces introduce special problems in regard to sufficiency of mechanical strength of rotor components, in particular the field coils on a salient pole rotor for a synchronous machine. These coils tend to be relatively heavy and not very strong or rigid as a unit. Hence, if such a coil is not firmly supported on the pole body and very well braced, it tends to move as a unit, its turns tend to move relative to one another or the coils tend to become distorted, all of which can damage the coil itself or the coil along with other parts of the machine.

Various schemes have been employed to prevent the coil movement relative to the rotor poles. It is well known to extend the pole tips beyond the coil surface and provide a securing means between these tips and the rotor. It is also well known to provide a wedge-like device between pairs of coils to bias them radially inwardly and tangentially toward their respective poles. However, means must be provided to retain the wedge itself in position to prevent its movement in an outward radial direction.

A common design in rotors of dynamoelectric machines entails the pressing-to-form of coils so as to allow the centrifugal force on the coil to be restrained by the respective pole tip. However, under high stress the coil is susceptible to distortion and the inner turns may slide tangentially to negate the press-to-form effect. A brace is again required with the attendant need for a means of securing the brace.

It is therefore an object of this invention to provide an improved field pole structure for a rotor of a salient pole machine.

Another object of this invention is the provision for tangential stabilization of pressed-to-form rotor coils.

Yet another object of this invention is the provision for preventing the distortion of pressed-to-form rotor coils under high stress conditions.

Still another object of this invention is the provision for a coil brace which is self-supporting.

A further object of this invention is the provision for a coil brace which is economical to manufacture and install, and extremely functional in use.

These objects and other features and advantages become more readily apparent upon reference to the following description when taken in conjunction with the appended drawings.

SUMMARY OF THE INVENTION

A self-supporting device is installed between adjacent pairs of pressed-to-form coils so as to mutually restrain the opposing inner corners thereof from lateral movement caused by the high stresses resulting from centrifugal forces. Adjacent pairs of spaced coils from at their opposing sides an acute angle ≤ 45° into which the wedge-shaped device conforms. The device extends radially inwardly beyond the inner surface of the coils where it flanges in opposite directions into two legs which are interposed in close relationship between the rotor core and the respective coil inner surfaces to hold the device in place. The device prevents distortion of the coils at the inner portion thereof and allows the pole tips to counteract the principal centrifugal forces acting on the coils. No special securing devices are required and the braces are applied to conventional coil arrangements without modifications being made thereto.

Figure 1:
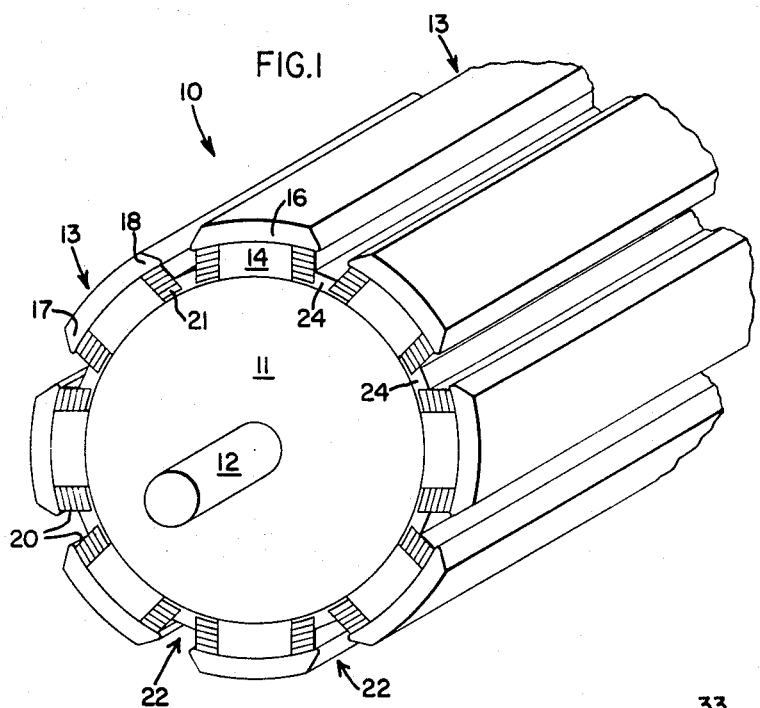
FIG. 1 is a perspective view of a salient pole rotor with the brace installed in accordance with the preferred embodiment.

In the drawings as hereinafter described, a preferred embodiment is depicted; however, various other modifications and alternate construction can be made thereto without departing from the true spirit and scope of the invention.

DESCRIPTION OF THE PREFERRED EMBODIMENT

Reference is now made to FIG. 1 which illustrates a dynamoelectric rotor 10 having a salient pole type of field structure for a synchronous machine. The magnetic core 11 is made up of a number of laminations stacked in axial alignment on a shaft 12.

Secured to and projecting radially outward from the core 11 toward the stator inner surface 15, is a plurality of arcuately arranged, equally spaced poles 13. The number of poles is significant only insofar as it relates to the feasibility of a pressed-to-form coil arrangement. Since this invention relates to such an arrangement, the number of poles is restricted to a minimum of eight, wherein the angular spacing therebetween is ≤ 45°. The geometry of a salient pole rotor is such that the utilization of the pressed-to-form coil concept is most effective when this minimum number of poles is employed.

The plurality of poles 13 are substantially identical with each comprising a pole body 14 and an integrally formed head 16 having oppositely protruding tips 17 and 18. Each pole extends the axial length of the core and has a coil 19 disposed thereon so as to surround the pole body 14 and occupy the space between the rotor core 11 and the pole tips 17 and 18.

The coils 19 comprise a plurality of flat turns 21 assembled together in a manner commonly known in the art as edge-wise-wound windings. Insulation material 20, such as asbestos, is interspersed between adjacent turns to prevent the flow of current therebetween.

Figure 2:
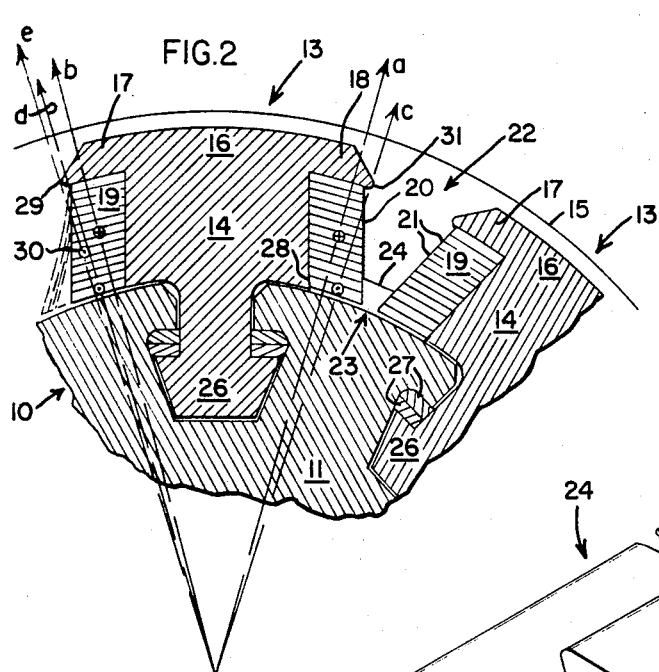
FIG. 2 is a partial transverse-sectional view thereof with certain directional forces indicated.

Between adjacent coils a V-shaped, interpolar gap 22 exists, convergent toward the center and terminating at the core periphery where the inner corners of adjacent coils are separated by a narrow space 23 (FIG. 2). Disposed in each of these spaces is a coil brace 24 which is peculiar to this invention.

Referring now to FIG. 2 a portion of the rotor 11 is shown in cross-section with a pair of adjacent poles 13 and their coils 19 being illustrated. The pole bodies 14 are secured to the core 11 by T-shaped tongues 26 which are inserted into similar shaped slots in the rotor core and secured therein by wedges 27 which draw the bodies 14 rigidly against the periphery of the rotor. Other securing arrangements such as bolts may be utilized, the important feature being that of having poles distinct from the rotor core and adapted to be radially drawn in to secure the associated coil in close relationship between the rotor core and the pole tips 17 and 18.

As stated hereinbefore a pressed-to-form coil arrangement is used only on rotors having eight or more poles. The significant feature of such an arrangement is that the pole tips and coil windings are canted so as to be disposed substantially at, but slightly beyond, the angle of being in tangential relationship with the rotor core, thereby resulting in a relatively stable disposition with respect to movement caused by centrifugal forces. In FIG. 2 the resultant centrifugal forces acting on the respective sides of the coil when the turns are considered as an integral unit are represented by the vectors $a$, and $b$ while those forces acting on the single innermost turn 28 are represented by the vectors $c$ and $d$. It can be seen that as the turns are considered individually, the resultant forces acting thereon tend to move outwardly toward the tip edges 29 and 31 as we approach the innermost turn 28.

Figure 3:
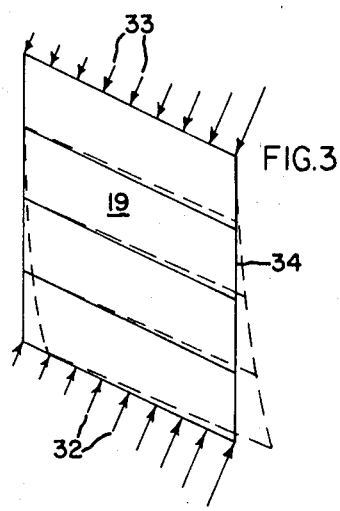
FIG. 3 is a partial sectional view of a pressed-to-form coil with distorting forces acting thereon.

FIG. 3 shows a representative portion of a pressed-to-form coil 19 wherein the centrifugal forces 32 acting outwardly are counteracted by the restrictive forces 33 of the pole tip. The resulting compression tends to increase as the outer edge 34 is approached, and the coil tends to deform to a configuration indicated by the dotted lines. As the temperature of the coil rises due to heat generation this deformation phenomena becomes even more a reality.

Referring back to FIG. 2 one side of the coil 19 (in dotted line) is shown as it would appear in a deformed condition. When the composite center of gravity is transferred outwardly to a new position 30, the vector $e$ representing the resultant centrifugal force acting thereon is found to pass outside the tip edge 29. When this condition exists the coil, and in particular its innermost turns, will tend to separate from the pole body 14 and may eventually result in a failure.

Figure 4:
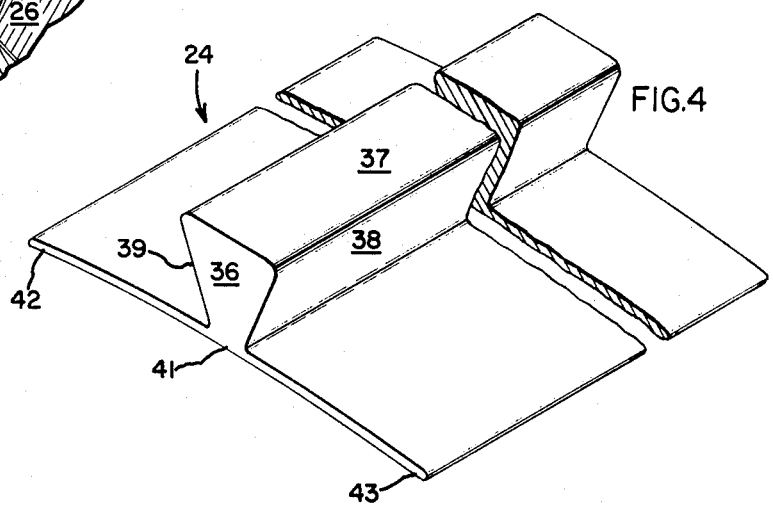
FIG. 4 is a perspective view of the coil brace of the preferred embodiment of this invention.

The coil brace 24 is therefore installed to prevent this lateral movement caused by deformation, so as to allow the pole tips to restrain the coil turns through the successive application of restrictive forces imposed by the individual adjacent turns. One of the braces 24 (FIGS. 1, 2, and 4) is installed between each pair of adjacent windings so as to mutually exert opposite forces thereon. It is supported by the coils themselves and requires no special attachments to retain it in place. The brace 24 (FIG. 4) comprises a wedge-like body 36 having an upper wall 37 and sidewalls 38 and 39, converging away from the upper wall and integrally attached to a flange portion 41, having legs 42 and 43 extending in opposite directions on either side of the body 36. Its length is substantially that of the axial length of the rotor core. The brace or any portion thereof may be hollow or may be of an integral solid construction as that shown in FIG. 4. Its composition may vary so long as it is non-conductive and possesses the required strength to withstand the forces and heat to which it is exposed. An insulated metal construction has been found satisfactory. However, a solid fiberglass construction is preferred because of economy and ease of manufacturing.

Installation of the braces is simply accomplished by axially inserting them between adjacent coils after the coils have been installed on the pole bodies 14, but before the poles have been rigidly drawn in to the rotor core surface. The wedge-like body portion 36 is frictionally placed in a tight fit relationship between the adjacent coils with the legs 42 and 43 being placed under the respective coils in direct contact with the rotor core surface. As the poles are drawn inwardly in a manner such as that described hereinbefore, the legs become tightly sandwiched between their respective coils and the core surface, thereby securing the brace from any movement and obviating the need for special securing devices. Further, the coils are of the conventional press-to-form construction and require no modification to adapt them to use with the coil brace.

It should be noted that even though the brace structure as shown comprises a single elongate element it may be segmented into a plurality of axially spaced portions to accomplish substantially the same results.

What I claim as new and desire to secure by Letters Patent of the United States are:

1. An improved rotor for a salient pole machine of the type having a rotor core, a plurality of angularly spaced pole bodies projecting radially from the core, each of the pole bodies having a head on the outer end thereof with tips projecting in both directions from the pole body in concentric relation to the core, means for securing the pole bodies to the rotor core, and a coil embracing each pole body so that adjacent coils are angularly spaced in respect to one another and define interpolar spaces, each space having an included acute angle toward the rotor core, wherein the improvement comprises:

at least one brace disposed between the coils in each of the interpolar spaces, said brace being tapered in cross-section so as to conform to and occupy only the radially inward portion of its interpolar spaces, with the preponderant remaining portion of the spaces being open to allow free ventilation to the coils, said brace having integrally secured on its radially inner end a flange portion having legs extending outwardly in opposite directions to be interposed in close frictional relationship between the rotor core and their respective coils, said legs comprising the sole means of securing said brace in the interpolar space and said brace acting to mutually exert opposing forces on the adjacent coils to prevent their movement away from the pole bodies when rotated.

2. An improved rotor as set forth in claim 1 wherein the coils are of the edge-wise wound type.

3. An improved rotor as set forth in claim 1 wherein said brace is an elongate member extending the axial length of the rotor core.

4. An improved rotor as set forth in claim 1 wherein the number of poles on the rotor is at least eight and the acute angle between poles is ≤ 45°.

5. An improved rotor as set forth in claim 1 wherein said brace is constructed of a non-conducting material.

* * * * *